May 21, 1968          D. M. BAILEY          3,383,881
METHOD OF CONTROLLING COMPOSITION BY PRESSURE
Filed Oct. 28, 1966
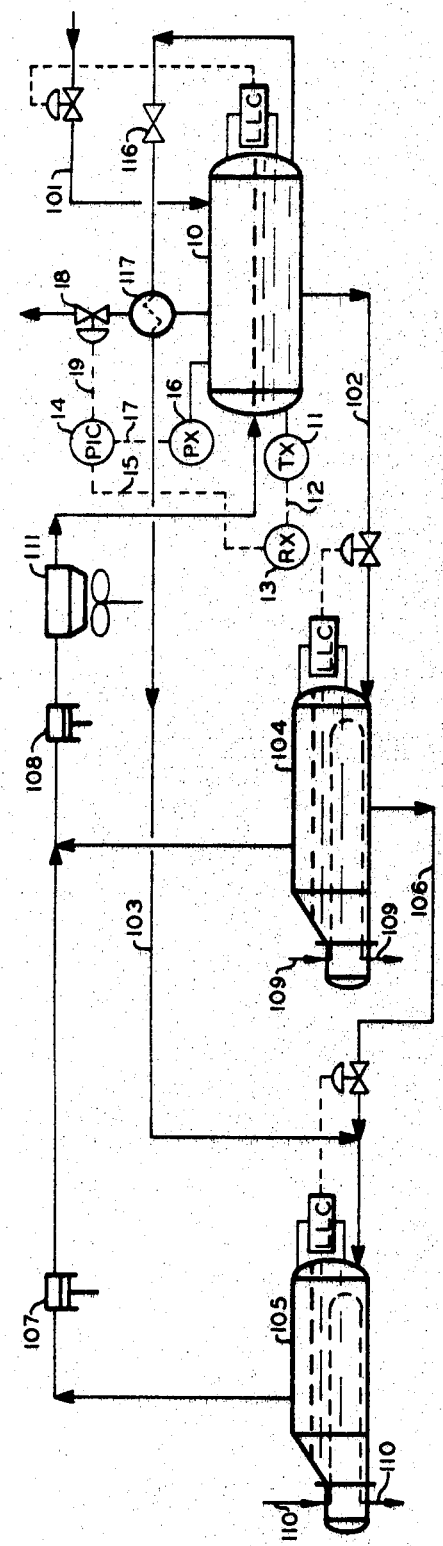
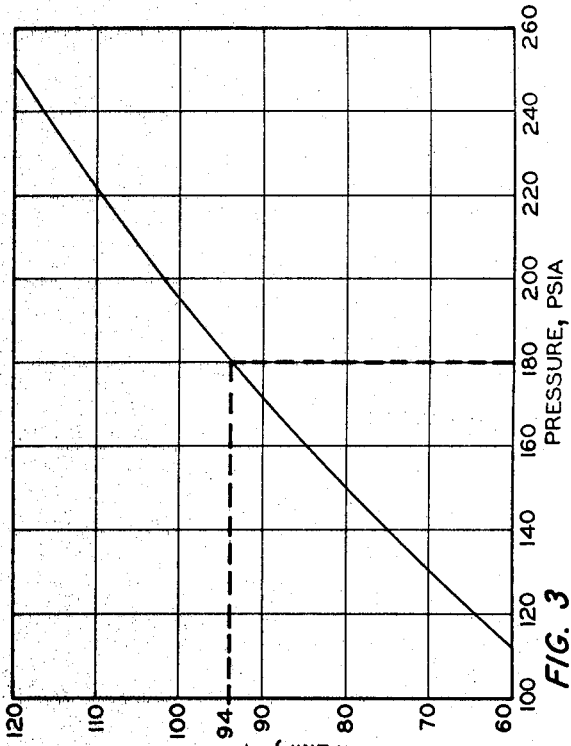
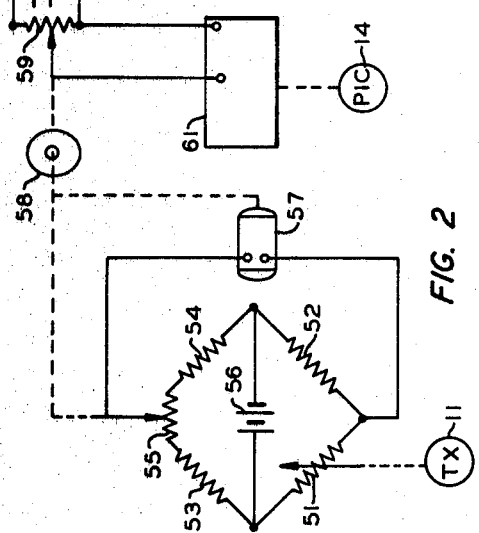
INVENTOR
D. M. BAILEY
BY *Young & Quigg*
ATTORNEYS United States Patent Office
3,383,881
Patented May 21, 1968

3,383,881
METHOD OF CONTROLLING COMPOSITION
BY PRESSURE
Dunn M. Bailey, Bartlesville, Okla., assignor to Phillips Petroleum Company, a corporation of Delaware
Filed Oct. 28, 1966, Ser. No. 590,325
6 Claims. (Cl. 62—45)

ABSTRACT OF THE DISCLOSURE

A method of maintaining a desired constant liquid composition in a mixture having a plurality of components existing both in the gaseous and liquid phases in a vessel, wherein the pressure in the vessel is measured and compared with the vapor pressure of the desired liquid composition as determined by the temperature of the liquid mixture in the vessel; the pressure in the vessel being adjusted responsive to the comparison. Apparatus for maintaining a constant liquid composition includes a vessel, gas pressure sensing means and liquid temperature sensing means, a temperature vs. pressure correlation means which provides a signal representative of the vapor pressure of the desired liquid composition at the sensed temperature and pressure control means for the vessel responsive to the signal generated by the pressure sensing means and the signal representative of the correlated vapor pressure.

---

This invention relates to a method and apparatus for controlling pressure by metering temperature.

The control of pressure is essential in many processes. Due to changes in atmospheric temperature, pressure regulation often becomes very difficult because of the fact that the components in the process adjust somewhat to atmospheric temperature; and as a result of said adjustment, optimum operating conditions are difficult to maintain. Conventional art generally teaches control of optimum operating conditions by control of pressure through manual setting of a pressure control device. Manual setting is unsatisfactory due to the fact that temperature changes caused by both daily and yearly temperature variations demand that the manual functions of setting the pressure control device be performed at frequent intervals. The instant invention provides for automatic pressure control at different temperatures, and hence, eliminates the unsatisfactory manual setting.

In one embodiment, this invention relates to a process for maintaining the composition of a refrigerant containing slight impurities of a more volatile component in a refrigeration system. The composition of this refrigerant is to be maintained such that the percentage of the more volatile component is less in the refrigerant than in the make-up stream. Stated another way, the make-up stream contains more volatile components than desired in the refrigeration system. This invention provides for the control of the refrigerant composition so as to reduce the amount of unwanted more volatile components.

One embodiment of the apparatus of this invention comprises a temperature sensing means, a means of correlating temperature and vapor pressure for a predetermined mixture of components and a means of adjusting the pressure to the proper level as determined by the correlation means. This invention finds particular application, although not limited thereto, to commercial refrigeration facilities.

For example, in refineries and for propane storage where a considerable amount of refrigeration is necessary, it is cheaper to use an impure mixture of a major amount of propane and a minor amount of ethane. A difficulty is encountered in that the impure mixture contains so great a quantity of the more volatile component that there is a waste of energy in the compression step due to the increased vapor pressure. This waste results from the compressors having to compress against a high vapor pressure. It then becomes necessary to vent vapors from the storage tank in order to reduce the vapor pressure of the refrigerant.

According to this invention, the horsepower requirement of the compressors is reduced by maintaining the pressure of the refrigerant at a predetermined level so as to prevent the build-up of the more volatile component. This pressure maintenance is the result of a control of refrigerant composition. As a result of reducing the horsepower requirement for the compressors by maintaining the refrigerant composition at a predetermined level, it is necessary to vent a stream of gas, which has a high concentration of ethane, from the propane-ethane refrigerant storage tank.

As has been previously stated, in order to get the proper pressure in the refrigerant storage tank, it is necessary to control the composition of the refrigerant. Preferably, the temperature of the refrigerant and the pressure in the refrigerant storage tank are regulated in accordance with a temperature-vapor pressure curve of the propane-ethane composition that has been selected as the refrigerant. When air fin coolers are used after the compressors, the temperature of the refrigerant in the refrigerant storage tank is much higher in the summer than in the winter and usually higher in the daytime than at night. The present invention measures the temperature in the tank and computes from that temperature the pressure which is to be maintained in said tank. The vapor pressure curve of the refrigerant composition determines what the relief pressure in the tank should be, and as the temperature in the tank goes up or down, as the case may be, the pressure relief valve is reset to vent the amount of ethane and propane desired to maintain the exact propane-ethane percentage refrigerant composition in the refrigeration system.

Accordingly, an object of this invention is to provide a method and apparatus whereby pressure can be controlled by sensing temperature.

Another object of this invention is to provide a method and apparatus whereby pressure can be controlled by sensing temperature and correlating pressure and temperature with optimum operating conditions through the use of a vapor pressure curve.

Another object of my invention is to provide a method and apparatus for decreasing the compressor horsepower in a compression system containing a plurality of components.

Another object of this invention is to maintain the optimum pressure against which refrigeration compressors operate when a multiple-component refrigerant is being used.

Other objects, advantages, and features of this invention will be readily apparent to those skilled in the art from the following description, drawing, and appended claims.

FIGURE 1 is an elevation view in cross-section of one embodiment of the invention as applied to a typical refrigeration system. FIGURE 2 represents an electromechanical analogy of the vapor pressure vs. temperature curve depicted in FIGURE 3.

Referring to FIGURE 1, there is illustrated a refrigeration system incorporating horizontal vessel 10 containing a refrigerant in both liquid and vapor phases. Attached to said horizontal vessel 10 is a temperature sensing means 11 in contact with and sensing the temperature of the said liquid phase of said refrigerant in horizontal vessel 10. Said temperature sensing means 11 generates an output signal by conduit means 12 reflective of the temperature sensed and communicates said signal to correlation means 13. Said correlation means 13 receives the aforementioned temperature signal and correlates said input temperature signal with a generated pressure signal through an electromechanical analogy, as indicated in FIGURE 2. The electromechanical analogy of FIGURE 2 comprises an analogy of the vapor pressure vs. temperature curve representing that composition of refrigerant components selected for optimum operating conditions, as indicated in FIGURE 3. The aforementioned output signal generated by correlation means 13 is communicated to and sets pressure control means 14 via signal conduit means 15.

With reference to FIGURE 2, there is indicated the aforementioned electromechanical analogy of the data represented in FIGURE 3. With more particular reference to FIGURE 2, there is indicated a temperature sensing means 11 corresponding to the identically numbered reference in FIGURE 1. Furthermore, there is indicated pressure control means 14 corresponding with the identically numbered reference in FIGURE 1. As has been heretofore disclosed, a correlation of the temperature sensed in temperature sensing means 11 and the pressure that is set in pressure control means 14 is effected by an electromechanical analogy which will now be described. There is indicated in FIGURE 2 a DC power source 56 surrounded by a resistance bridge, capable of being balanced, containing variable resistors 51 and 55, further containing resistors 52, 53, and 54. Additionally, there is indicated electrically driven motor 57, powered by an output from the resistance bridge capable of being balanced. Electrically driven motor 57 is mechanically linked to an eccentrically designed cam 58 and to variable resistor 55 such that the motor, when actuated, will cause eccentrically designed cam 58 to rotate and at the same time will rebalance said resistance bridge by causing a variation in magnitude in variable resistor 55. The eccentrically designed cam 58 then actuates variable resistor 59, thus varying the power that DC power source 60 is capable of placing into electricity to pressure transducer 61. Electricity to pressure transducer 61 is capable of resetting the pressure in pressure control means 14.

During the operation of the electromechanical analogy of the vapor pressure vs. temperature data, indicated in FIGURE 3, a signal is sensed by temperature sensing means 11. This sensed signal alters the resistance of variable resistor 51 in the previously balanced resistance bridge. As a result of unbalance in the bridge, DC electrical power source 56 impresses a potential across electrically driven motor 57; said signal actuates electrically driven motor 57, thereby moving eccentrically designed cam 58 and mechanically adjusting resistor 55 so as to rebalance the resistance bridge and destroy the potential impressed across electrically driven motor 57 by DC electrical power source 56. Movement of the eccentrically designed cam 58 alters the resistance in resistor 59, thereby altering the potential that DC power source 60 is capable of impressing into pressure transducer 61. The electrical signal impressed into electricity to pressure transducer 61 results in said electricity to pressure transducer 61 altering the pressure set point in pressure control means 14.

In accordance with this invention, the correlation of the temperature sensing means 11 and pressure control means 14 has been effected in accordance with the vapor pressure vs. temperature data, depicted in FIGURE 3. Specifically, this was achieved by preparing data, such as depicted in FIGURE 3, for the selected refrigerant, said data preparation being by a method which will later be described, and incorporating this correlation into eccentrically designed cam 58.

According to the concept of this invention, the data correlation between vapor pressure and temperature, one embodiment being illustrated in FIGURE 3, is effected by first selecting a refrigerant. The refrigerant can comprise any plurality of miscible or immiscible compounds and can be selected to meet any particular needs. In one embodiment, a mixture of 1.5 mol percent ethane and 98.5 mol percent propane was found to be satisfactory. After the refrigerant is selected, a vapor pressure vs. temperature curve for the specific refrigerant is prepared in a manner which is disclosed in FIGURE 3. The preparation of this curve is in accordance with a method wherein data representing the vapor pressure of the refrigerant at various temperatures are plotted over the temperature and pressure ranges of predicted operation. After ploting the various data points, said data are represented by the graphical method, well known in the art, of connecting the data points with a relatively smooth line. If a plurality of immiscible components are used in the embodiment of the invention, the pure component vapor pressure for the identified species is summed at various points of temperature and the data represented graphically in the identical manner as has been heretofore described. If the refrigerant comprises a plurality of miscible components, the mol percentage of each miscible component is first determined, whereupon the mol percentage of the pure component vapor pressure for each component is summed at various conditions of temperature and the data graphically represented as has been heretofore described. After the vapor pressure vs. temperature curve as has been prepared, as represented by FIGURE 3 for one embodiment of the invention, the eccentrically designed cam 58 is created in such a manner that the aforementioned correlation is effected.

In one embodiment, it was desired to operate at a pressure above the aforementioned vapor pressure vs. temperature curve. In this embodiment, the curve was prepared in the same manner; however, the constant value of pressure was added before plotting each point. This produced a curve differing from the first curve described only by the constant value of pressure selected. The position of the second curve which is plotted below the first curve will depend upon the cost of power and the cost of makeup refrigerant. The closer the second curve is drawn to the first curve, the higher the cost of refrigerant and the lower the cost of power. This results in lowering the second curve from the first curve to the extent that the cost of power plus the cost of refrigerant will be a minimum. Although it is fully within the scope of this invention to operate with any constant value being added to the first curve, in a preferred embodiment, a value of 5 p.s.i. was selected. The second curve is usually from 5 to 10 p.s.i. above the first curve.

Referring again to horizontal vessel in FIGURE 1, there is illustrated pressure sensing means 16, said pressure sensing beans 16 being capable of sensing vapor phase pressure in horizontal vessel 10; wherein said pressure sensing means 16 generates a signal reflective of the pressure sensed; wherein said pressure sensing means 16 communicates said signal to pressure control means 14 via signal conduit means 17.

Pressure control means 14 generates a signal which actuates valve means 18, being communicated to valve means 18 by signal conduit means 19; wherein said valve means 18 effects the required pressure level of the vapor phase refrigerant in horizontal vessel 10. Since the makeup contains a greater proportion of the more volatile component than desired, the pressure in horizontal vessel 10 will always tend to increase rather than decrease. Consequently, valve means 18 will always reduce rather than increase the pressure. The signal generated by pressure control means 14 reflects failure of the vapor phase refrigerant pressure to correspond with the pressure of optimum operating conditions as determined by correlation means 13 and as set in pressure control means 14 by correlation means 13; consequently, pressure control means 14 generates a signal subsequently resulting in the adjustment of the vapor phase refrigerant pressure to that selected by correlation means 13.

In one embodiment, the invention was utilized in a propane pressure refrigeration system, such as is disclosed in FIGURE 1. With respect to the operation of the embodiment of FIGURE 1, there is indicated refrigerant input conduit 101 introducing the propane-ethane refrigerant into horizontal vessel 10 on response from the attached liquid level control. There are additionally indicated refrigerant output conduits 102 and 103. The refrigerant is removed from horizontal vessel 10 and introduced into refrigeration zones 104 and 105 by virtue of conduits 102 and 106, as demanded by the attached liquid level control. Valve 116 in conduit 103 is opened to allow only enough refrigerant to flow through heat exchanger 117 to condense a large portion of the propane in the vapor being vented from storage tank 10. Additionally, refrigerant is removed from refrigeration zone 104 and introduced into refrigeration zone 105 by conduit 106. Within refrigeration zones 104 and 105 a liquid-vapor phase transition is effected, wherein the energy associated with the liquid-vapor transition is withdrawn from the liquid propane in refrigeration zones 104 and 105; said liquid-vapor transition being effected by the compressor suction resulting from the operation of compressors 107 and 108. As a result of the energy consumed in the liquid-vapor transition, the refrigerant in refrigeration zones 104 and 105 is chilled. A material to be chilled is then introduced into refrigeration zones 104 and 105 through conduits 109 and 110, respectively; wherein said material is circulated within refrigeration zones 104 and 105, chilled as a result of the cold refrigerant, and subsequently removed from the refrigeration zones. Compressors 107 and 108 effect a vapor compression, whereupon the hot vapor is condensed in heat exchanger 111 and reintroduced into horizontal vessel 10, thus completing the refrigeration cycle.

It is also within the scope of this invention to control a predetermined composition of immiscible components through correlation of temperature and pressure in precisely the same manner as disclosed for miscible components.

Additionally, it is within the scope of this invention to control a predetermined composition of a greater number of materials than two, regardless of their miscible or immiscible characteristics, by utilizing the previously disclosed procedure.

This invention, in its broadest sense, is applicable to controlling composition of a plurality of components wherein temperature determines pressure.

Various modifications of this invention can be made in view of the foregoing disclosure and the appended claims without departing from the spirit or scope thereof.

In a specific embodiment of this invention, a propane refrigeration process is designed to operate on propane. The system is charged with propane; however, there are impurities of ethane as a natural consequence of the difficulty of their separation. These impurities of ethane result in a refrigerant with a higher vapor pressure than desired which in turn results in a needless waste of compressor horsepower.

In the same specific embodiment as described above, a liquid composition consisting of 98.5 mol percent propane and 1.5 mol percent ethane was selected. The vapor pressure vs. temperature curve over the anticipated operating conditions was prepared in the previously explained manner. A temperature sensing means, depicted in FIGURE 1 as reference 11, was installed in the propane receiving tank and utilized to transmit a DC electrical signal to an electromechanical analogy of the vapor pressure vs. temperature curve for the selected liquid composition. In one embodiment, a thermocouple was used. In this embodiment, a temperature of 94° F. was sensed. The electromechanical analogy consists of a Wheatstone bridge which regulates the power input to a servo motor mechanically linked to and driving an eccentrically designed cam. The eccentric design of the cam is such that the logarithmic pressure-temperature function is mechanically analogized. Referring to FIGURE 3, an optimum operating pressure of 180 p.s.i.a. was selected by the analogy for the particular temperature of 94° F., previously sensed. The eccentrically designed cam analogizing the vapor pressure vs. temperature function operates a variable resistor in such a manner as to alter the DC electrical signal to a pressure transducer. The pressure transducer sets the desired pressure to be maintained in a pressure control device. In the same embodiment as is being described, the pressure set in the pressure control device, depicted as pressure control means 14 in FIGURE 1, was 180 p.s.i.a.

Attached to the propane receiver there is a pressure sensing device 16 that senses the pressure of the vapor phase of the refrigerant in said propane receiver and communicates this information to the aforementioned pressure control. At such time as the pressure sensing device communicates to the pressure controller that the pressure of the vapor phase of the refrigerant is above the level indicated by the electromechanical analogy and set by the electromechanical analogy in the pressure controller, and in the same embodiment as previously mentioned 180 p.s.i.a., said pressure controller communicates with and actuates motor valve 18 thereby reducing the pressure of the vapor phase of the refrigerant in the propane receiver to the control level, which in the particular embodiment, previously described, was 180 p.s.i.a.

What is claimed is:
1. A method of maintaining a desired constant liquid composition in a mixture having a plurality of components, said mixture existing in both a gaseous and a liquid phase in a pressure vessel into which components are introduced and removed, comprising the steps of:
 (a) measuring the temperature of the liquid phase of said mixture;
 (b) measuring the pressure of the gaseous phase of said mixture;
 (c) correlating said measured temperature with the vapor pressure characteristics of said desired liquid composition to determine the gaseous pressure, or a pressure varying by a constant value therefrom, exerted by said desired liquid composition at said measured temperatures;
 (d) comparing said measured temperature with the pressure determined by said correlation step (c);
 (e) adjusting the pressure exerted in said vessel by the gaseous phase of said mixture responsive to the results of said comparison step (d).
2. The method of claim 1 wherein said components comprise propane and ethane.
3. The method of claim 1 wherein said pressure determined in step (c) varies from the gaseous pressure exerted by the desired liquid composition at said measured temperature by a constant value not more than 10 p.s.i.
4. Apparatus comprising:
 a pressure vessel;
 temperature sensing means connected to the lower portion of said vessel, capable of sensing temperature and generating a signal reflective of the temperature sensed;
 pressure sensing means connected to the upper portion of said vessel, capable of sensing gaseous pressure and generating a signal reflective of the pressure sensed;
 temperature vs. pressure correlation means communicating with said temperature sensing means and accepting said signal responsive of temperature sensed and capable of correlating said sensed temperature with pressure and generating a signal responsive of said correlated pressure;
 pressure control means attached to said vessel, capable of accepting said pressure correlated signal and said pressure reflective signal and controlling the gaseous pressure within said vessel in response thereto.
5. The apparatus of claim 4 wherein the temperature sensing means comprises a thermocouple; the temperature vs. pressure correlation means comprises an electromechanical analogy; the pressure control means comprises a pressure indicator controller and valve.

6. The apparatus of claim 5 wherein the electromechanical analogy comprises a Wheatstone bridge providing variable potential input to an electric motor mechanically linked to and driving an eccentrically designed cam, wherein the eccentrically designed cam is such that a logarithmic vapor pressure vs. temperature function is mechanically analogized; a pressure transducer, wherein the eccentrically designed cam analogizing the vapor pressure vs. temperature function operates a variable resistor in such a manner as to alter the DC electrical signal to said pressure transducer; wherein said pressure transducer sets the desired pressure to be maintained by use of said pressure indicator controller and valve.

References Cited

UNITED STATES PATENTS

| | | | |
|---|---|---|---|
| 3,245,248 | 4/1966 | Ritter | 62—50 X |
| 3,247,713 | 4/1966 | Reed | 62—49 X |

LLOYD L. KING, *Primary Examiner.*